(12) United States Patent
DeGroot

(10) Patent No.: US 7,967,131 B2
(45) Date of Patent: *Jun. 28, 2011

(54) LOW FRICTION, DIRECT DRIVE CONVEYOR WITH A RAKED TOOTH DRIVE

(75) Inventor: Michael DeGroot, Grand Rapids, MI (US)

(73) Assignee: Thermodrive LLC, Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/896,929

(22) Filed: Oct. 4, 2010

(65) Prior Publication Data

US 2011/0017578 A1    Jan. 27, 2011

Related U.S. Application Data

(63) Continuation of application No. 12/162,846, filed as application No. PCT/US2007/061546 on Feb. 2, 2007, now Pat. No. 7,841,463.

(60) Provisional application No. 60/743,212, filed on Feb. 2, 2006.

(51) Int. Cl.
*B65G 23/04* (2006.01)
(52) U.S. Cl. ........ 198/835; 198/832; 198/834; 474/205; 474/152
(58) Field of Classification Search ................... 198/835
See application file for complete search history.

(56) References Cited

U.S. PATENT DOCUMENTS

| 2,901,777 | A | 9/1959 | Sofio |
| 3,066,359 | A | 12/1962 | Kalwaites |
| 7,841,463 | B2 * | 11/2010 | DeGroot ........................ 198/835 |

* cited by examiner

*Primary Examiner* — Gene Crawford
*Assistant Examiner* — William R Harp
(74) *Attorney, Agent, or Firm* — McGarry Bair PC

(57) ABSTRACT

An endless conveyor belt has teeth with drive faces raked away from the direction of travel. The belt can be driven by a drive pulley having sheaves with drive faces raked toward the direction of travel. The drive faces on the sheaves engage the drive faces on the teeth to move the belt and the raked angle tends to pull the belt inwardly. A stationary foot assists removing a driven tooth from its corresponding sheave.

16 Claims, 4 Drawing Sheets

LOW FRICTION, DIRECT DRIVE CONVEYOR WITH A RAKED TOOTH DRIVE

CROSS-REFERENCE TO RELATED APPLICATION

This application is a continuation of U.S. application Ser. No. 12/162,846, filed Jul. 31, 2008, now U.S. Pat. No. 7,841,463, issued Nov. 30, 2010, which claims the benefit of International Application No. PCT/US2007/061546, filed Feb. 2, 2007, which claims priority from U.S. provisional application Ser. No. 60/743,212, filed Feb. 2, 2006, all of which are incorporated herein in their entireties.

BACKGROUND OF THE INVENTION

1. Field of the Invention

The invention relates to endless belts for conveyors and, more particularly, to an endless conveyor belt using raked teeth or sheaves to be driven by a pulley.

2. Description of the Related Art

Conveyors with friction-driven flat belts are known systems for moving items from one location to another. A tensioned, endless belt extends between a drive pulley and a tail piece (typically a pulley or a fixed bar), whereby friction between the drive pulley and the belt enables transfer of torque from the former to the latter to thereby induce movement of the belt. Because tension on the belt is required to maintain the requisite friction for moving the belt, this type of conveyor does not perform well in environments where the tension and friction can be compromised. For example, the introduction of oil, grease, or other effluents from products carried on the belt can result in a loss of friction and thereby detrimentally affect the performance of the conveyor.

Another type of conveyor comprises a direct or positive drive modular belt. In this type of conveyor, a modular belt formed of a plurality of interlocking links extends between a drive pulley and an idler pulley and comprises a plurality of teeth that engage corresponding sheaves on the drive pulley, or alternatively, teeth on the drive pulley engage the links or sheaves on the belt. Interaction between the teeth and sheaves transfers torque to the belt. As a result, the conveyor does not rely on friction for moving the belt, and friction reducing compounds do not affect performance in the manner described above for friction-driven belts. However, low tension, direct drive modular belts are difficult to clean and to maintain. They are also porous and therefore cannot readily carry products such as powders and the like.

Conveyors with low friction, positive drive endless belts 100 having a flat surface 102 on one side and teeth 104 on the other side, as illustrated in FIG. 1, overcome the problems associated with the friction-driven flat belts and the modular belts. The seamless flat surface 102 is generally made of a thermoplastic material, non-porous and easy to clean, while the teeth 104 engage sheaves 106 on a drive pulley 108 to transfer torque to the belt 100 without requiring friction between the belt 100 and the drive pulley 108 or tension in the belt 100. Such a conveyor is disclosed in U.S. Patent Application No. 60/593,493, which is incorporated herein by reference in its entirety.

To account for belt stretching, it has been determined that the tooth pitch of the belt must be less than the sheave pitch of the drive pulley at less than maximum elongation of the belt. Also, the pulley pitch must equal the pitch of the belt at maximum elongation, give or take a fraction of a percent. Moreover, to ensure that the belt teeth are positioned to enter the pulley sheaves, the longitudinal width of each sheave in the pulley must exceed the belt tooth longitudinal width at least by the amount of distance generated by elongating the belt the maximum allowable amount over the span of the belt wrap. As a result of the pitch and width differences, the teeth and the sheaves will be longitudinally aligned as long as the elongation is at or below the maximum elongation.

Due to the pitch difference between the belt and the pulley, only one belt tooth will be driven by a pulley sheave at any given moment. It has been found that this engaged tooth is always the tooth that is about to exit the pulley. For all subsequent belt teeth that enter the pulley sheaves at any given moment, there is a gap between the driving face of the belt tooth and the driving face of the pulley sheave, and that gap progressively increases in size for each successive tooth. Consequently, as the exiting tooth disengages from the drive pulley, there remains some amount of gap between the following belt tooth, i.e., the trailing tooth, and the face of its respective pulley sheave. At this time, the pulley continues to rotate relative to the belt without moving the belt, and the effective drive characteristics are lost until the driving face of the sheave abuts the driving face of the trailing tooth. In other words, the pulley rotates while the belt slips until a tooth engages again. Discounting any momentum of the belt and any friction between the belt and the pulley, the belt will effectively stop for a brief moment until the following sheave engages the trailing tooth, which thereby becomes the new "exit tooth".

Some slip between the belt and the pulley is what enables a direct drive application to work. This temporary disengagement of belt teeth from pulley sheaves causes the average belt speed to be less than the average pulley speed. In fact, the average belt speed is less than the pulley speed by the percentage of elongation that is still available in the belt (maximum elongation—current elongation). Because of this necessary slip, any friction between the pulley and the belt will compromise the benefits of direct drive. Friction between the belt and the pulley will retard slippage and can cause the trailing tooth to miss the pulley sheave altogether. To avoid such friction, the belt and the pulley can be made of, or coated with anti-friction materials, the pulley can be designed such that the belt and pulley have reduced contact area between the sheaves, and the belt is preferably maintained under low tension.

Also, to ensure that the engaged (driven) tooth stays engaged until the appropriate time to exit the sheave, a position limiter is used adjacent the belt.

Long belt runs in conveyor applications such as those moving coal, ore, or gravel typically require heavy, reinforced belts to minimize stretching and large drive motors to move the heavy belt as well as the load on the belt. The foregoing thermoplastic, low friction, direct driven belt has not been shown to be conducive to long belt runs. And the complexity of requiring position limiters to keep the drive tooth engaged with the pulley would only serve to complicate such a system in the harsh environment of moving coal, ore, or gravel.

SUMMARY OF THE INVENTION

According to the invention, an endless conveyor belt has an outer carrying surface and an inner surface on a side of the belt opposite to the outer carrying surface. In one embodiment, a plurality of teeth extends from the inner surface wherein each tooth has a drive face on a trailing side of the tooth relative to the drive direction that is raked to form a first angle between the drive face and the inner surface that is acute. In another embodiment, a plurality of sheaves extends inwardly from the inner surface wherein each sheave has a drive face on a leading side of the sheave relative to the drive direction that is raked to form a first angle between the drive face and the inner surface that is acute.

DETAILED DESCRIPTION

Figure 1:
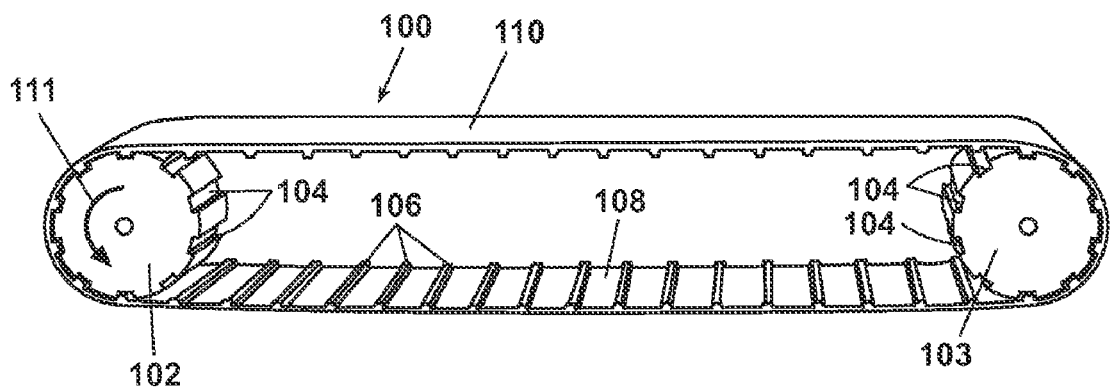
FIG. 1 is a side view of a prior art conveyor.
Figure 2:
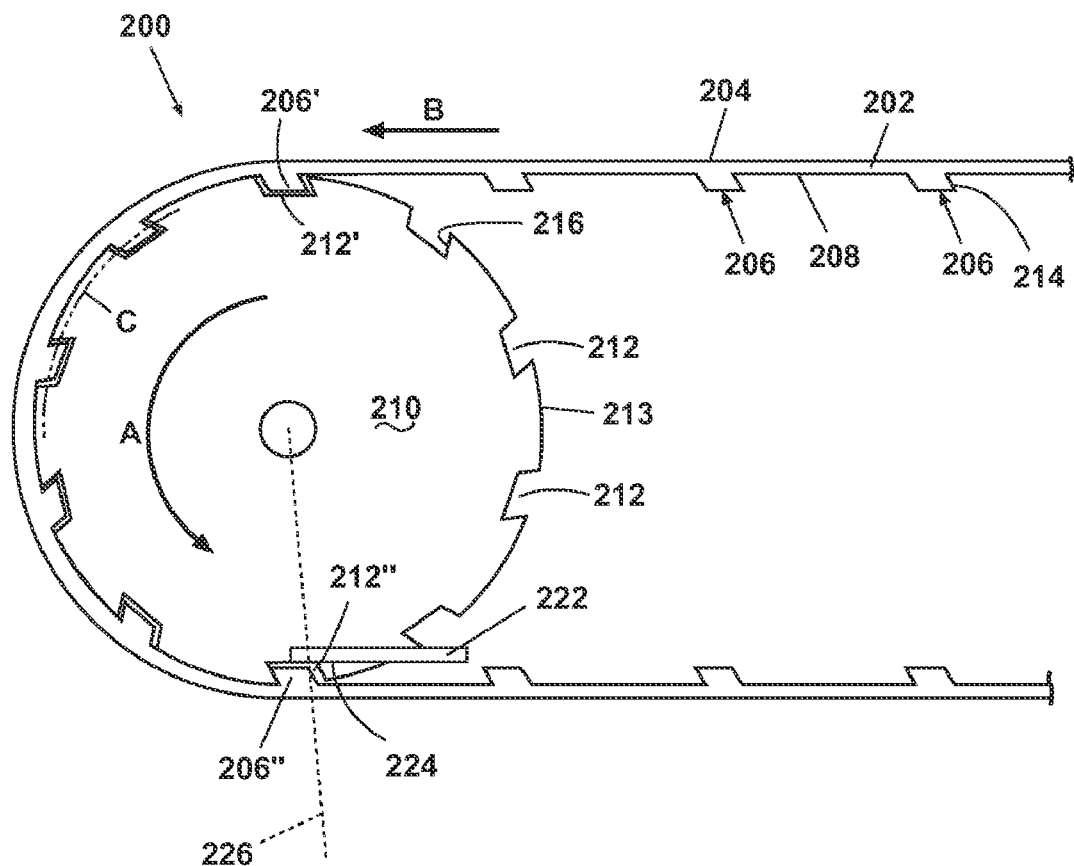
FIG. 2 is an enlarged view in elevation of a portion of one embodiment of a conveyor according to the invention.
Figure 3:
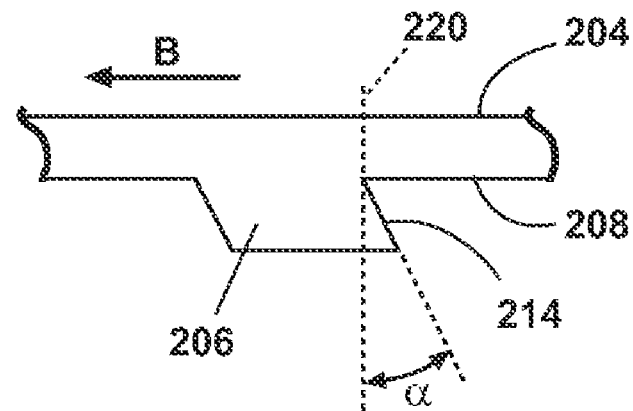
FIG. 3 is an enlarged portion of the belt of FIG. 2.
Figure 4:
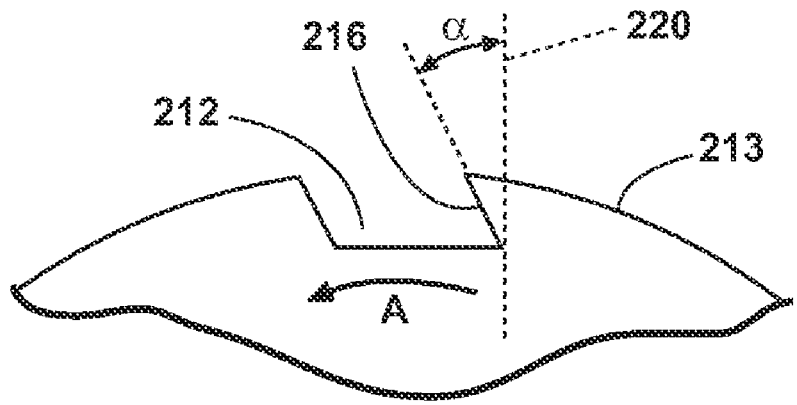
FIG. 4 is an enlarged portion of the drive pulley of FIG. 2.

One embodiment of a conveyor according to the invention can be seen in FIGS. 2-4. The conveyor 200 comprises an endless belt 202 with an outer smooth, generally continuous carrying surface 204 on one side of the belt, and a plurality of teeth 206 evenly spaced from each other on an opposite side of the belt. The belt 202 is preferably made of a thermoplastic material and may be reinforced. An inner surface 208 extends between adjacent teeth, generally parallel to the carrying surface. The belt 202 wraps partly around a pulley 210 having a plurality of transverse grooves or sheaves 212 equally spaced from each other about the periphery of the pulley. Each tooth 206 has a drive face 214 and each sheave has a drive face 216. As the pulley 210 rotates in a drive direction denoted by arrow A, each tooth 206 is drawn into a corresponding sheave 212 with the drive face 214 of the tooth facing the drive face 216 of the sheave as the belt 202 wraps around the pulley 210. The pitch of the belt teeth 206 is less than the pitch of the pulley sheaves 212 along a coincident arc C at a given radius from the center of the pulley, and the width of each sheave is greater than the width of each tooth. Thus, as the belt 202 begins to wrap around the pulley 210, the entering tooth 206' to enter its corresponding sheave 212' will have its drive face 214 spaced from and not engaged with the drive face 216 of the sheave. This condition prevails until it reaches the position of the last tooth 206", which engages the drive face 216 of the corresponding sheave 212" and which engagement pulls the belt 202 in a drive direction denoted by arrow B.

A tooth 206 can be seen more clearly in FIG. 3 having a height that is preferably less than the depth of a sheave 212. The tooth drive face 214 is disposed on a trailing side of the tooth 206, relative to the drive direction B. As well, the tooth drive face 214 is raked. In other words, the tooth drive face 214 extends at an acute angle α from an imaginary plane 220 that is perpendicular to the carrying surface 204 and to the inner surface 208. Moreover, the tooth drive face 214 extends away from the drive direction B.

Similarly, a sheave 212 can be seen more clearly in FIG. 4. The sheave drive face 216 is disposed on a trailing side of the sheave 212, relative to the drive direction A of the pulley 210, and extends at an acute angle α from an imaginary plane 220 that is perpendicular to the circumferential edge of the pulley 210. In this case, the drive face 216 extends toward the drive direction A.

As a consequence, when the sheave drive face 216 engages the tooth drive face 214 of the last tooth 216", their respective orientations tend to cause the sheave 212 to pull the corresponding tooth 206 inwardly toward the center of the pulley 210. In a situation where the belt 202 effectively a wraps around the pulley 210 as in FIG. 2, it may be necessary to assist removal of the driven tooth 206 from the corresponding sheave 212 when the tooth is due to exit the sheave at an exit point 226. A stationary foot 222 is mounted adjacent to the pulley 210 at the exit point 226 in a position where the tooth 206 will contact the foot. The foot 222 will have a bearing surface 224, at least a portion of which is positioned tangent to an imaginary circle formed by the bottom of the teeth 206 as the teeth wrap around the pulley 210. As the drive face 216 of the sheave 212 in the pulley continues to urge the belt 202 in the drive direction A, the bearing surface 224 of the foot 222 will bar the tooth 206 from continuing to rotate with the pulley, and instead urge the tooth out of the sheave by forcing the tooth drive face 214 to slide relative to the sheave drive face 216 against the tendency to pull the tooth 206 inwardly toward the center of the pulley. Because the foot 222 is stationary, each succeeding driven tooth 206 will likewise be urged out of its corresponding sheave 212.

They angle α is preferably about 2° or 3°, although it may vary from application to application and from load to load. Typically it will be in a range from 1° to 5°. The angle should be able to provide 1 or 2 pounds of force in order to draw the corresponding tooth inwardly of the sheave toward the center of the pulley.

Figure 5:
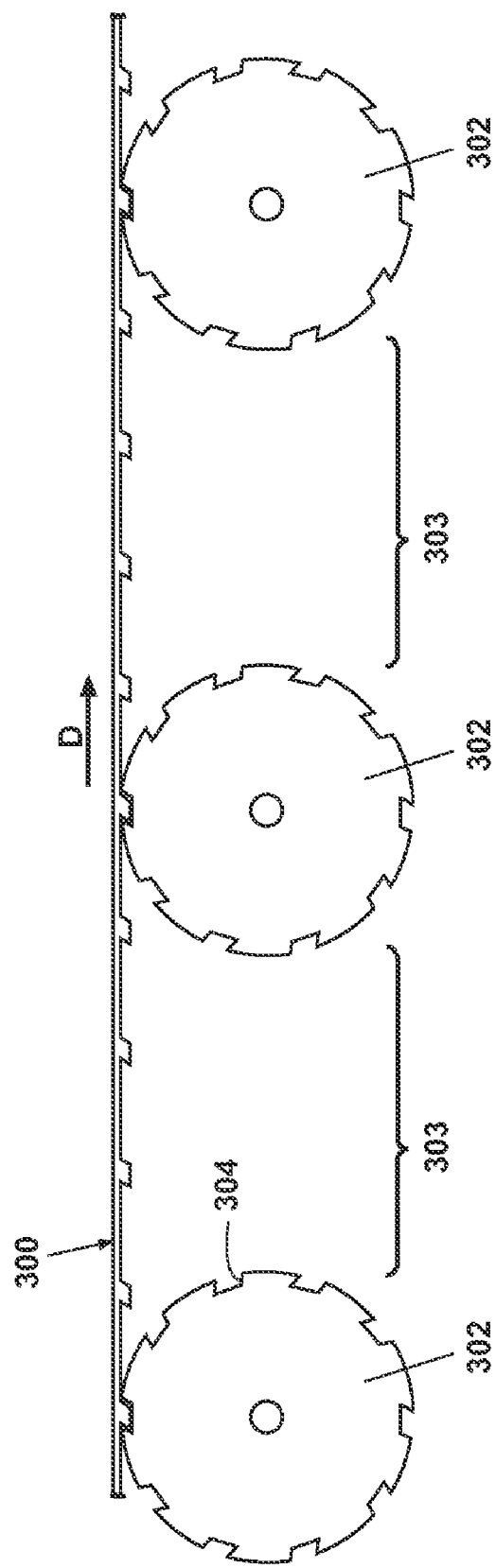
FIG. 5 is an elevational view of a portion of a second embodiment of a conveyor according to the invention.

This tendency of the raked tooth and sheave arrangement to grab and pull the belt toward the pulley means that the belt need not wrap very much around the pulley, if at all, thereby further minimizing the possibility of friction and enhancing the direct drive features. It also means that the arrangement is well-suited for other applications for elongated conveyors such as the embodiment shown in FIG. 5. This is a type of application that might be used for carrying a constant load such as coal, gravel, or ore. An endless thermoplastic belt 300 that may be reinforced extends over a plurality of drive pulleys 302, each having an identical configuration to the others, separated from each other across a span 303 and similar to that illustrated in FIG. 2. Each pulley 302 may have more or less sheaves 304. The belt 300 has a plurality of teeth 306 on one side in the manner shown in FIG. 2, and as the belt passes over a pulley, the teeth 306 are driven by corresponding sheaves 304 in the same manner explained above in a direction denoted by the arrow C. Preferably, each pulley 302 is a drive pulley in that it separately drives a portion of the belt that it contacts. In this way, the pulleys 302 can pull the belt 300 over a long distance. Optionally, each pulley 302 can be fitted with a foot (not shown) in order to assist disengaging the teeth 306 from the corresponding sheaves 304.

Consequently, a long conveyance can be driven by a plurality of smaller motors instead of one large motor. In addition, the belt can be lighter in weight and even stretchable instead of the conventional heavy belts currently in use. It will be apparent that the belt 300 need only be strong enough to support and pull the length of span 303 between adjacent pulleys 302.

While the invention has been specifically described in connection with certain specific embodiments thereof, it is to be understood that this is by way of illustration and not of limitation, and the scope of the appended claims should be construed as broadly as the prior art will permit. For example the grooves or sheaves can be on the belt and the teeth can be on the pulley. As well, the leading edges of the sheaves and teeth can be any shape, and need not be raked at the same angle as the drive faces.

What is claimed is:
1. A conveyor belt for being driven in a drive direction by a pulley having drive sheaves, the conveyor belt comprising an outer carrying surface, an inner surface on a side of the belt opposite to the outer carrying surface, and a plurality of teeth extending from the inner surface wherein each tooth has a drive face on a trailing side of the tooth relative to the drive direction that is raked to form a first angle between the drive face and the inner surface that is acute.

2. The conveyor belt of claim 1 wherein a second angle between the drive face and an imaginary plane perpendicular to the inner surface is also acute.

3. The conveyor belt of claim 2 wherein the second acute angle is within a range of about 1° and 5°.

4. The conveyor belt of claim 3 wherein the second angle is about 2°.

5. The conveyor belt of claim 1 wherein the outer carrying surface is smooth and generally continuous.

6. The conveyor belt of claim 1 wherein the belt is made of thermoplastic material.

7. The conveyor belt of claim 1 wherein the belt is reinforced.

8. The conveyor belt of claim 1 wherein the height of each tooth is less than the depth of the drive sheaves.

9. A conveyor belt for being driven in a drive direction by a pulley having drive teeth, the conveyor belt comprising an outer carrying surface, an inner surface on a side of the belt opposite to the outer carrying surface, and a plurality of sheaves extending inwardly from the inner surface wherein each sheave has a drive face on a leading side of the sheave relative to the drive direction that is raked to form a first angle between the drive face and the inner surface that is acute.

10. The conveyor belt of claim 9 wherein a second angle between the drive face and an imaginary plane perpendicular to the inner surface is also acute.

11. The conveyor belt of claim 10 wherein the second acute angle is within a range of about 1° and 5°.

12. The conveyor belt of claim 11 wherein the second angle is about 2°.

13. The conveyor belt of claim 9 wherein the outer carrying surface is smooth and generally continuous.

14. The conveyor belt of claim 9 wherein the belt is made of thermoplastic material.

15. The conveyor belt of claim 9 wherein the belt is reinforced.

16. The conveyor belt of claim 9 wherein the height of each tooth is less than the depth of the drive sheaves.

* * * * *